2,943,982
PROCESSING OF DICALCIUM PHOSPHATE AND COMPOSITION THEREOF

Clarence W. Dahlin, 76 Pilgrim Road, Wellesley, Mass.

No Drawing. Filed Oct. 10, 1955, Ser. No. 539,695

8 Claims. (Cl. 167—93)

This invention relates to a method of processing dicalcium phosphate, $CaHPO_4 \cdot 2H_2O$, and more particularly to a method of subdividing crystals of this material without the application of mechanical grinding action.

In keeping with the polybasicity of phosphoric acid, there exist several calcium phosphates, varying in hydrogen content. The present invention is concerned with hydrated calcium hydrogen phosphate, $CaHPO_4 \cdot 2H_2O$, commonly called dicalcium phosphate. This is widely available commercially in quite pure form. Dicalcium phosphate is particularly suited as a polishing agent, especially for relatively soft surfaces. It finds application, for example, as a polishing agent in dentifrices, silver polishes, lacquer and furniture rubbing compounds, and the like. It is also widely used as a food supplement, and in many preparations thereof, used in suspended form in a liquid vehicle, so that fine particle size is a primary desideratum, so that a stable suspension free of settling can be achieved. Fine particle size also hastens any process in which dicalcium phosphate is consumed from a suspension thereof.

A difficulty which has been encountered in the utilization of dicalcium phosphate, and throughout the specification the hydrated dicalcium phosphate, $CaHPO_4 \cdot 2H_2O$, is to be understood by this term, is that it is not available in sufficiently fine particle size. Most concerns provide a dicalcium phosphate completely or substantially on passing a standard 325 mesh sieve. However, the maximum dimensions of the opening of such a sieve is 44 by 44 microns, which is large compared with a desired size of one or two or three microns. For example, the finest commercial dicalcium phosphate which I have found available has particles of generally plate-like shape of which the largest are about 30 by 40 microns in dimensions, but the smallest are approximately 5 by 10 microns in dimensions. While it might be possible to reduce the size of this material by specialized grinding methods such as micronizing or steam jet milling or the like, this is an expensive and troublesome expedient and in any case does not appear to have been resorted to by commercial manufacturers of dicalcium phosphate. Again, even if such a fine dicalcium phosphate were available, dispersion thereof into a slurry or suspension would present technical difficulties of about the same kind encountered when paint pigments are ground into a vehicle.

An object of the present invention is to provide a method for the comminution of dicalcium phosphate.

Another object of the present invention is to provide a method for the reduction in particle size of dicalcium phosphate by the application of heat alone.

Another object of the present invention is to provide a stable suspension of dicalcium phosphate which has been reduced in particle size.

Another object of the present invention is to provide a suspension of finely-divided dicalcium phosphate in the micron particle size range free of any tendency of crystal growth.

Another object of the present invention is to provide a method of simultaneously subdividing and forming a dispersion of dicalcium phosphate particles with a minimum of mechanical treatment.

Other objects of the invention will appear as the description thereof proceeds.

Generally stated, and in accordance with an illustrative embodiment of the invention, I form a suspension of pulverized dicalcium phosphate in water which also contains suspended therein a swelling clay of the montmorillonite group. This suspension is then rapidly brought to a temperature of 200° F. or higher and maintained at such a temperature for a short time, whereupon the preparation is cooled or allowed to cool for subsequent use. In view of the boiling point of water of 212° F. at sea level and even less at higher altitudes, it is desirable to carry out the heat processing step just referred to in an autoclave, that is, in a vessel in which the pressure exerted by the water which has been brought to the elevated temperature can be resisted. Even if a temperature of slightly less than the boiling point of water is used for the process, it is obviously desirable to use a closed vessel in order to eliminate evaporation.

A practical maximum temperature of about 300° F. may be set for general use, since the comminution brought about by the heat process described takes place at less than this temperature, and above about 300° F. the pressure exerted by the water becomes troublesome. Also, if the suspension being processed contains other materials, particularly organic additives, these may be damaged by prolonged exposure to extremely high temperatures. The suspension may be processed in bulk, either in batches or continuously in a high temperature, high pressure heat exchange assembly, or it may be bottled prior to processing, and the heat processing carried out in bottles, capped or uncapped as desired, which are heated bodily in a suitable autoclave or other hermetically sealed vessel.

An important requirement is that the temperature of the dicalcium phosphate in the presence of the other specified materials be raised to 200° F. or higher rapidly. A "flash" cooking, such as is conveniently brought about by the use of live steam as the heating means, is desirable. The temperature of 200° F. or higher should be reached within at most about fifteen minutes from the start of heat processing, when the reactants are originally at room temperature. I have found that if the temperature is raised very slowly, for example, one-half degree Fahrenheit per minute, the dicalcium phosphate particles may crack but do not break apart, so that dispersion of the small particles is not effected. A minimum heating rate in the region from about 180° F. to 200° F. or such higher temperature as is used of five degrees per minute may be specified.

The presence of a swelling clay of the montmorillonite group is essential to the success of the invention. Lacking the presence of such a clay, the comminuted crystals have a tendency to grow once more to larger sizes, and most of the objects of the invention will therefore not be achieved. The term "swelling clay of the montmorillonite group" is recognized in mineralogy. It comprises specific swelling montmorillonite, swelling beidellite, swelling saponite, swelling hectorite, and swelling montronite, all as more particularly described in United States Geological Survey Professional Paper No. 205–B, entitled "Minerals of the Montmorillonite Group," by Ross and Hendricks, Washington, 1945. Swelling minerals of the montmorillonite group are commercially available under the general and common term of bentonite. Further descriptions of swelling clays of the montmorillonite group are given in United States Bureau of Mines Technical Paper No. 609, entitled "Bentonite, Its Properties, Mining, Preparation, and Utilization." It is to be noted that certain minerals of the montmorillonite group may exist in such a state that the exchangeable bases are calcium or calcium and magnesium ions, and thus will not swell. Such bentonites are termed "sub-bentonites" in the Bureau of Mines technical paper referred to and indeed generally throughout the literature, and are not used in the present invention because they will not disperse in water. They are, of course, not included in the term "swelling clays of the montmorillonite group." In general, any bentonite meeting the specifications in the United States Pharmacopeia as a bentonite is suitable since that specification is drawn to swelling bentonites. Bentonite from the Black Hills region of Wyoming and South Dakota, and indeed this constitutes the swelling bentonite most generally obtainable commercially, is especially suitable, particularly since it is available from a number of suppliers, and is relatively inexpensive. It constitutes the ordinary "bentonite" or "swelling bentonite" or "Wyoming bentonite" of commerce. Also quite suitable is swelling hectorite, commercially available from a deposit near Hector in San Bernardino County, California, and described on page 27 of the Geological Survey professional paper referred to hereinabove.

The concentrations of the two essential solid ingredients, namely the dicalcium phosphate and the swelling clay of the montmorillonite group, in the water are subject to variation within wide limits. There is really no lower limit of concentration of the dicalcium phosphate, except that it would be pointless to use so little that it could not be found in the suspension. The function of the water appears to be largely that of providing a water-saturated environment, so that as much as 55 parts by weight of dicalcium phosphate and 45 parts by weight of water can be used although such a slurry would be difficult to handle because of its semi-solid character. The swelling clay of the montmorillonite group must be present at least to the extent of about $\frac{1}{30}$ part by weight of the dicalcium phosphate. Because of the exceedingly finely-divided particle size of such swelling clays when dispersed in water, however, even $\frac{1}{30}$ part by weight is more than sufficient to provide a coating for the surface of the crystals which are formed from the dicalcium phosphate even after comminution in accordance with the process described. Larger amounts of the swelling clay will do no harm, and indeed it may be desirable to have larger amounts present in order to impart the specific suspending property of the various clays to the suspension, as might be desirable for example when a polish is to be prepared.

When the processing has been carried out as has been described, with the materials present which have been described, then it has been found that the dicalcium phosphate is reduced in particle size to an average range of 1 to 4 microns. This is accomplished by the heat treatment alone in the presence of the water and the swelling clay. While I do not wish to be bound by any theory of operation, it appears that the water of crystallization of the dicalcium phosphate crystals causes a general shattering of the crystals, the shattering resulting in drastic comminution. This would also explain the necessity for rapid heating. Then the swelling clay, such as for example the bentonite, prevents the reagglomeration or regrowth of the crystals after the temperature has been lowered. Here again, I do not wish to be bound by any theory of operation, but there appears to be a reaction between the montmorillonite clay surface and the dicalcium phosphate crystal surface, largely physico-chemical in nature. The effect of the processing in accordance with the invention can be readily followed by microscopic observation, and the results are rather startling.

Some examples of procedures in accordance with the invention are now given:

Example I

| | Parts |
|---|---|
| Dicalcium phosphate, commercial minus 325 mesh | 54 |
| Water | 44 |
| Wyoming bentonite | 2 |

The dry ingredients are well mixed together and the water then added to form a slurry. The slurry is placed in an autoclave and rapidly heated to 250° F. and maintained at that temperature for one hour. It is found that the dicalcium phosphate has been reduced in particle size, and the pasty slurry thus obtained is useful as a polishing compound.

Example II

| | | |
|---|---|---|
| Dicalcium phosphate, U.S.P | grams | 22 |
| Wyoming bentonite, U.S.P | do | 3.5 |
| Sodium benzoate, U.S.P | do | 0.1 |
| Distilled water, q.s. ad | cc | 100 |

Wyoming bentonite is dispersed in the water with agitation, and two hours later the dicalcium phosphate and sodium benzoate are added with agitation. The preparation is put in bottles, capped and put in an autoclave at 250° F. for a total heating time of one-half hour, after which the bottles are allowed to cool. A bland, stable suspension of dicalcium phosphate results, of exceedingly fine particle size, and the suspension is useful as an additive to liquid and semi-solid feed stuffs for animal feeding, as well as a source of dicalcium phosphate for nutritional requirements in general.

Example III

| | Lbs. |
|---|---|
| Dicalcium phosphate | 50 |
| Pure white Hector bentonite, powdered | 3 |
| Water | 47 |

The Hector bentonite is dispersed in the water in a propeller-type mixer, and the suspension thus formed is passed through a colloid mill for more rapid dispersion of the bentonite. Then the dicalcium phosphate is added, the suspension placed in a closed but not hermetically sealed steam-heated kettle and brought to 225° F. in ten minutes. A suspension of very finely-divided dicalcium phosphate is obtained.

This application is a continuation in part, that is, a continuation as to common subject matter, of my application Serial No. 254,209, filed October 31, 1951, and my co-pending application Serial No. 319,421, filed November 7, 1952, both now abandoned.

The invention having been described, what I claim is:

1. The process of simultaneously comminuting dicalcium phosphate and forming a suspension thereof comprising, bringing dicalcium phosphate together with water and a minor amount of a swelling clay of the montmorillonite group, heating the mixture thus formed to at least 200° F., said temperature being attained within fifteen minutes, and subsequently cooling the mixture for use.

2. The process of simultaneously comminuting dicalcium phosphate and forming a suspension thereof comprising, bringing dicalcium phosphate together with water and a minor amount of a swelling clay of the montmorillonite group, heating the mixture thus formed to at least 200° F., said heating being carried out at a rate not less than 5° F. per minute throughout the interval 180° F. to 200° F., and subsequently cooling the mixture for use.

3. The process of simultaneously comminuting dicalcium phosphate and forming a suspension thereof comprising, forming a mixture of dicalcium phosphate and at least $\frac{1}{30}$ of the weight thereof of a swelling clay of the montmorillonite group in water, heating the mixture thus formed to at least 200° F., said temperature being attained within fifteen minutes and subsequently cooling the mixture for use.

4. The process of simultaneously comminuting dicalcium phosphate and forming a suspension thereof comprising, forming a slurry of dicalcium phosphate and at least 1/30 of the weight thereof of a swelling clay of the montmorillonite group in water, heating the mixture thus formed to at least 200° F., said heating being carried out at a rate not less than 5° F. per minute throughout the interval 180° F. to 200° F., and subsequently cooling the mixture for use.

5. The process of simultaneously comminuting dicalcium phosphate and forming a suspension thereof comprising, forming a dispersion in water of a swelling clay of the montmorillonite group, adding to said dispersion dicalcium phosphate in an amount at most equal to 30 times the weight of swelling clay contained therein, heating the mixture thus formed to at least 200° F., said heating being carried out at a rate not less than 5° F. per minute throughout the interval 180° F. to 200° F., and subsequently cooling the mixture for use.

6. The process of claim 4 in which the swelling clay is a swelling bentonite.

7. The process of claim 4 in which the swelling clay is U.S.P. bentonite.

8. An aqueous suspension of dicalcium phosphate comprising water, dicalcium phosphate having a particle size of about 1 to 4 microns, and a swelling clay of the montmorillonite group to the extent of at least 1/30 of the weight of the dicalcium phosphate, the said dicalcium phosphate having been heat-shattered by the process of claim 1.

References Cited in the file of this patent

UNITED STATES PATENTS

| | | |
|---|---|---|
| 1,943,856 | Cross | Jan. 16, 1934 |
| 2,296,494 | Block | Sept. 22, 1942 |
| 2,359,326 | Moss | Oct. 3, 1944 |
| 2,462,104 | Knox | Feb. 22, 1949 |
| 2,689,170 | King | Sept. 14, 1954 |
| 2,697,024 | Moss | Dec. 14, 1954 |

OTHER REFERENCES

De Kay: Bull. Am. Soc. of Hosp. Pharm., vol. 9, Sept.-Oct. 1952, pp. 520–521.

Outlines of Ind. Chem., The Macmillan Co., N.Y., 1908, 2nd ed., pp. 16–17.

Ray et al.: Reprint from The Dental Cosmos, Nov. 1933, pp. 1–4.